United States Patent [19]
Phillips

[11] Patent Number: 5,233,731
[45] Date of Patent: Aug. 10, 1993

[54] DOOR PANEL CONNECTOR

[75] Inventor: David J. Phillips, Holland, Mich.

[73] Assignee: Prince Corporation, Holland, Mich.

[21] Appl. No.: 795,183

[22] Filed: Nov. 19, 1991

[51] Int. Cl.$^5$ .............................................. A44B 17/00
[52] U.S. Cl. ........................................ 24/297; 24/453; 52/716.6
[58] Field of Search ............... 24/297, 293, 289, 563, 24/453, 601.2, 102 SL; 52/509, 510, 718.1; 296/39.1, 39.2

[56]  References Cited

U.S. PATENT DOCUMENTS

| | | | |
|---|---|---|---|
| 2,118,800 | 5/1938 | Smith | 52/718.1 |
| 3,177,540 | 4/1965 | Hall et al. | 24/453 |
| 3,230,592 | 1/1966 | Hosea | 52/509 |
| 3,239,988 | 3/1966 | Meyer | 52/718 |
| 3,249,973 | 5/1966 | Seckerson | 24/297 |
| 3,745,612 | 7/1973 | Seckerson | 24/73 |
| 3,940,901 | 3/1976 | Nivet | 52/718.1 |
| 4,472,918 | 9/1984 | Mach | 52/511 |
| 4,505,611 | 3/1985 | Nagashima et al. | 403/406 |
| 4,506,419 | 3/1985 | Mitomi | 24/297 |
| 4,691,416 | 9/1987 | Nakayama et al. | 24/601.2 |
| 4,707,020 | 11/1987 | Enokida et al. | 296/191 |
| 4,708,895 | 11/1987 | Mizusawa | 24/297 |
| 4,797,983 | 1/1989 | Barnett et al. | 24/289 |
| 5,056,199 | 10/1991 | Stein et al. | 24/297 |

FOREIGN PATENT DOCUMENTS 0191851  9/1985  Japan ..................... 24/289

Primary Examiner—Victor N. Sakran
Attorney, Agent, or Firm—Price, Heneveld, Cooper, DeWitt & Litton

[57]   ABSTRACT

A connector for joining automobile panels. A retainer member having a shaped slot is molded into a door panel and receives a flat headed stud for supporting a hook surrounded by a sealing flange for hooking over an edge of an opening in a sheet metal door panel for fastening the panels together.

14 Claims, 2 Drawing Sheets

DOOR PANEL CONNECTOR

BACKGROUND OF THE INVENTION

In the assembly of an automobile, numerous connectors are used to hold various panels and trim strips in position. It is common practice in the assembly of the door of an automobile to use plastic connectors to hold the trim panels on the inside of the door. Since water can enter a door separate rubber washers have been used in combination with the connectors to prevent the water from entering the interior of the automobile where it would stain a cloth trim panel on a door. When it was necessary to service the inside of a door, for example the mechanisms for raising and lowering the window or for latching and locking the door, the interior trim panels had to be removed. A common connector used to support trim panels is of the so-called christmas tree-type Which, when once put in place, has to either be broken or seriously damaged to the point that it is no longer reusable in order to remove the door panel. If the Christmas tree connector was molded to the door panel, the door panel would have to be replaced in order to have usable connectors. This resulted in an unnecessary expense in that an entire door panel had to be replaced in order to replace several inexpensive plastic connectors.

SUMMARY OF THE INVENTION

In accordance with the present invention, a connector is provided which has an integral water seal thereby eliminating the need for separate rubber washers. The connector is also serviceable in that it will tightly hold the door panels together while at the same time is capable of being removed with a door panel without damage to the connector which would render the connector unserviceable. In the unlikely event that the portion of the connector used to connect the door panel becomes broken or seriously damaged, that portion of the connector can be replaced by sliding a new connecting piece into the anchor portion of the connector.

The connector of the present invention is made of two major parts. The first part is a hollow retainer or anchor member which has a closed end with a shaped slot. The retainer member is intended to be molded into plastic molding material on a surface of a door panel with the slot adjacent the surface of the molding material. The second member of the connector is a hook member which has an outwardly turned hook extending from the center portion of a base. A supporting stud projects from the opposite side of the base. A sealing flange extends about the edge of the supporting base and is dished toward the hook with the hook at the center of the dish and with the edge of the dish projecting in the direction of the hook. The bottom of the hook member has a compound camming surface with a curved entry surface leading to a sharply inclined surface which terminates at the supporting base. The projecting supporting stud has a substantially flat head in the center of which is positioned an alignment member having spaced parallel sides. A plug is provided for the open end of the hollow retainer member. The plug is adapted to be press fitted into the retainer member and is used to prevent the plastic molding material from entering into the retainer member. A pair of spaced, substantially parallel projections extend from the inner surface of the plug and cooperate with the alignment member on the head of the supporting stud to preclude rotation of the hook.

DETAILED DESCRIPTION OF THE PREFERRED EMBODIMENTS

Figure 1:
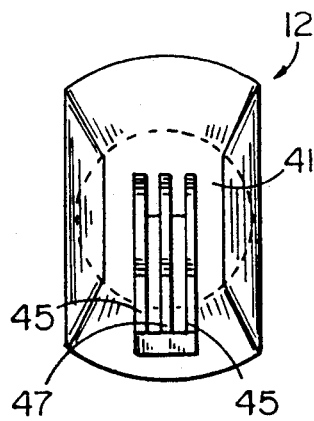
FIG. 1 is a front elevational view of the hook member of the connector.
Figure 2:
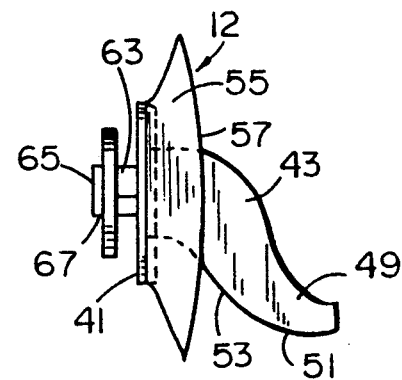
FIG. 2 is a side elevational view of the hook member.
Figure 3:
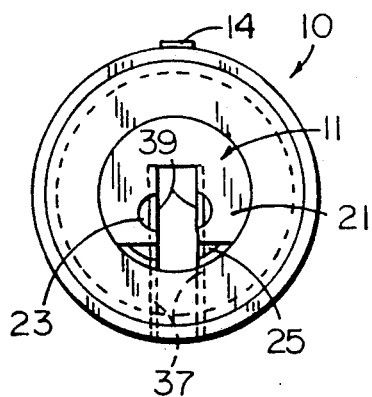
FIG. 3 is a front elevational view of the retainer member or anchor member of the connector with the rear plug in place.
Figure 4:
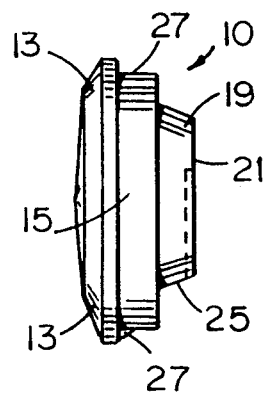
FIG. 4 is a side elevational view of the closed retainer member.

Referring now to FIGS. 1-4, the connector of the present invention has two major components, the retainer member 10 and the hook member 12. Retainer member 10 is of substantially hollow circular configuration with a raised stepped end portion 11 and a cap portion 13. Retainer member 10 has a circumferential sidewall 15 supporting a first flat surface 17. Substantially centrally disposed on surface 17 is another sidewall 19 which supports a slotted end wall 21. End wall 21 has a substantially keyhole-shaped slot 23 which extends across surface 21 to an open portion 25 in sidewall 19. Sidewall 19 is cut out at 25 to receive the supporting head of hook member 12 and has spaced parallel edges to pass an alignment member on the supporting head of the hook member. Sidewall 15 has spaced projecting members 27 which prevent retainer member 10 from rotating when it is supported in the plastic molding material.

Since retainer member 10 is intended to be molded in place and since it is hollow, a cap 13 is provided to prevent the molding material from entering into the interior of the retainer member. The cap is preferably attached to the retainer member by a living hinge 14 enabling the retainer member and cap to be molded in a single operation. The bottom of the cap is reinforced by a pair of ribs 37 from which a pair of substantially parallel upstanding members 39 project. When cap 13 is snap-fitted into place in the bottom of retainer member 10, projecting alignment members 39 align with slot 25 in edge 19 and also with the center with keyhole slot 23 in surface 11.

Figure 7:
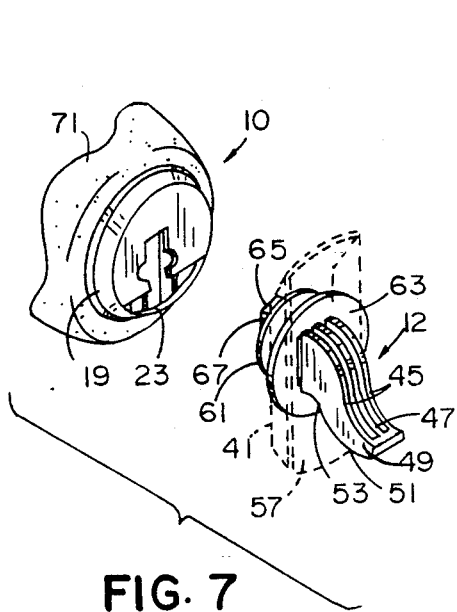
FIG. 7 is a perspective view showing the retainer supported in a plastic molding material and with the hook member aligned with the retainer.
Figure 6:
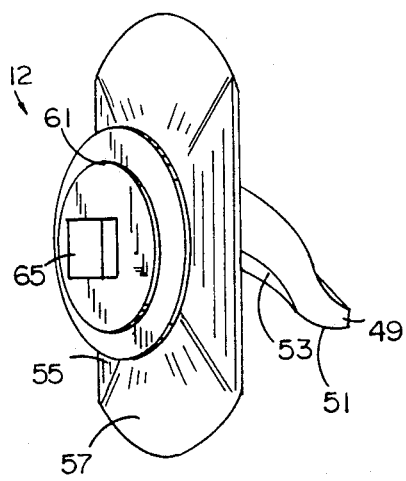
FIG. 6 is a rear perspective view of the hook member.

Hook member 12 has an enlarged, thickened supporting portion 41 from which a shaped hook 43 extends. Hook 43 is enlarged where it joins base 41 to provide maximum strength at that point. Hook 43 can be of solid molded plastic or, and more preferably, can be made of three substantially identical spaced supporting ribs (FIGS. 1 and 7) with outer ribs 45 forming the side of the hook and with a central rib 47 forming the center of the hook with the inner edges of the hooks being joined by a continuous plastic web.

Figure 5:
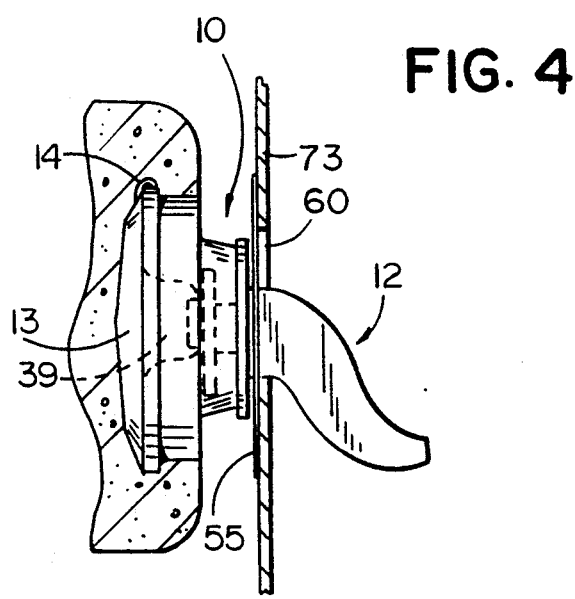
FIG. 5 is a side elevational view showing the retainer member supported by plastic molding material and with the hook member gripping a sheet of metal.

Hook 43 is turned outwardly and has a tapered distal end 49 for easy entrance into an aperture in a metal panel or part. The bottom surface of hook 43 has a compound camming surface which has a smoothly curved portion 51 proximate distal end 49, which leads to a sharply inclined camming surface 53, which can be at approximately 45°, which ends or abuts the surface of supporting washer or flange 41. The compound camming surface provides easy entry of the hook into an aperture and then, once in place, leads an edge of the metal panel sharply into the crux of the hook where the panel can be held pressed against the face of support 41. Since the connector is primarily intended for use in the assembly of automobile doors, it has an integral sealing flange 55 supported about hook 43. The sealing flange is dished with the base of hook 43 being at the bottom of the dish and with the projecting edge 57 of the sealing flange surrounding hook 43 and extending away from support 41 in the same direction as hook 43. When hook member 12 is used in the assembly of a door (FIG. 5) hook 43 is passed through an aperture 60 in the door, preferably a square aperture, and sealing flange 55 is forced tightly about the edge of the aperture sealing out any water which might come from the interior of the door and attempt to pass through into the interior of the automobile.

Hook member 12 is supported in retainer member 10 by means of a flat headed stud 61 which is spaced from the back of base member 41 by a shaped stud 63. Stud 63 is shaped to be complementary to slot 23 in retainer member 10 and can be characterized as a key-shaped stud, the slot in the surface of the retainer member being keyhole-shaped. On the outer or end surface of flat headed stud 61 is an alignment portion 65. Alignment portion 65 has spaced parallel sides 67 which cooperate with the edges of projecting members 39 on cap 13 to prevent hook member 12 from rotating when it is supported in retainer member 10.

The two components of the hook member are preferably made of an organic polymeric material such as Nylon; however, other engineering plastic materials which can be molded, and which will resist cutting or being cut by the edge of the metal panels, and which will also not fracture in cold weather, can be used. With these physical characteristics in mind, numerous suitable plastic materials can be selected.

Figure 8:
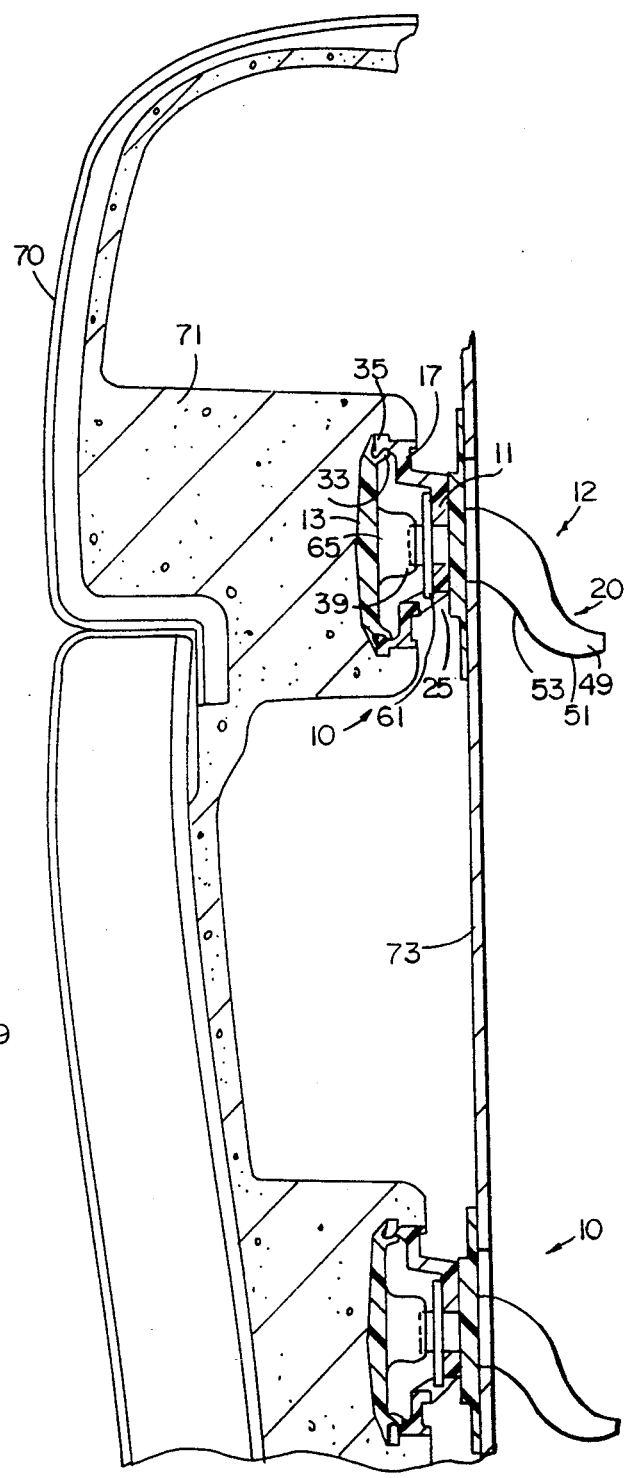
FIG. 8 is a schematic sectional view of a pair of connectors holding a metal panel in place.

As shown in FIG. 8, retainer or anchor member 12 is shown supported in a layer of plastic molding material 71 on one side of a door panel 70. The lower surface 17 is substantially in alignment with the surface of the plastic molding material with raised surface 21 projecting above the surface. The plastic molding material can also cover the closed sides of wall 19 of the retainer member so long as opening 25 in the wall is not obstructed. Cap member 13 is snapped in place in the open end of the retainer member before it is molded into the plastic material. Retainer member 10 is positioned so that slots 25 and 21 face downwardly. Hook member 12 is then slid lockably upwardly into the slot until it is snapped in place with alignment member 65 positioned between the edges of projecting members 39 which extend from cap 13.

Hook member 12 has its distal end 49 passed through the aperture in the door panel 73 so that the metal edge will slide along compound camming surfaces 51 and 53. Metal panel 73 is held tightly between base 41 and camming surface 53 on hook 43. When hook member 12 is forced into place against panel 73, water sealing flange 55 will be tightly pressed against the surface of panel 73 sealing the aperture in the panel and preventing any water from passing through the door into the interior of the vehicle.

When it is desired to remove door panel 70 from metal panel 73, the door panel is raised to lift hook members 12 out of the apertures in the metal panel. Hook members 12 remain supported by retainer or anchor members 10. In the event a hook member is badly damaged or broken in separating the panels, the remainder of the hook members can be knocked out of the holding slot in the retainer member. A new hook member can then be slid into the holding slot and the door panels are again ready to be connected. The expensive door panel is reusable by the mere replacement of an inexpensive plastic connector part. Panel 70 can be replaced by merely reversing the aforedescribed procedure.

While it is preferred to use both the anchor and hook parts of the connector, there may be occasions where only the hook part is needed, for example, in supporting a small panel which will almost never have to be removed once put in place. In this situation the head and projecting stud portion on the back of the hook can be embedded in the plastic molding material up to the base of sealing flange 55. The hook is then used as previously described with the sealing flange closing the aperture about the hook.

From the above description it can be seen that a reusable, serviceable connector is provided having an integral water seal. The connector can be used in the assembly of door panels. Through the use of the plastic connector the door panels on the inside of the vehicle can be removed for servicing of the door and be easily replaced without damaging the connector. If a connector is damaged, the broken portion of the connector can easily be replaced saving the door panel for reuse.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows:

1. A connector for joining two pieces together comprising:
    a hook member having an outward turned hook for attachment to a first piece and an integral sealing flange surrounding said hook; said hook member further including a locking stud extending in a direction from said sealing flange opposite said hook; and
    a retainer member for attachment to a second piece, said retainer member including a keyed slot for lockably receiving said locking stud for removably supporting said hook member to said retainer member.

2. A connector for releasably joining a first piece to a second piece comprising:
    a hook member having an outwardly turned hook portion;
    an enlarged base portion attached to said hook portion;
    a compound camming surface on said hook portion, said camming surface having a curved portion extending inwardly from the end of said hook member to a sharply inclined camming surface leading to said enlarged base member;

a stud portion on the side of said base portion opposite said hook portion;

a flat washer portion on said stud portion and spaced from said enlarged base portion by said stud portion; and a retainer member including a keyed slot for lockably receiving said stud portion of said hook member, said retainer member further including means for anchoring said retainer member in one of the pieces to be connected.

3. A connector as set forth in claim 2, including a projecting alignment portion extending from the side of said flat washer opposite said stud portion.

4. A connector as set forth in claim 3, wherein said projecting alignment portion has spaced parallel edges.

5. A connector as set forth in claim 2, wherein said stud portion is key-shaped.

6. A connector as set forth in claim 2, including a sealing portion extending outwardly beyond the edge of said base portion where said hook portion joins said base portion.

7. A connector as set forth in claim 10, wherein said sealing portion is dished with the edges of said sealing portion surrounding said hook portion and projecting away from said base portion.

8. A connector as set forth in claim 2, wherein said outwardly turned hook portion has a tapered distal end to facilitate entry of said hook into an aperture in a part to be connected.

9. A connector for joining two pieces together comprising:

a hook member having an outward turned hook and an integral sealing flange surrounding said hook; and p1 a retainer member for supporting said hook member, said retainer member including a support member comprising a raised hollow retainer member having a stepped end wall; a closed continuous wall supporting a first surface on said retainer member; a second surface supported by ad spaced from said first surface, said second surface having a shaped sot therein; a wall for supporting said second surface spaced from said first surface, said wall having an opening therein in line with said slot in said second surface; and a closure member for closing the open end of said hollow retainer member opposite said stepped end wall.

10. A connector as set forth in claim 9, including a pair of upstanding spaced alignment members on a surface of said closure member for projecting into said raised hollow retainer member for gripping said alignment member on said flat washer portion of said hook member.

11. A connector as set forth in claim 9, including at lest one projecting portion on the outer surface of said closed continuous wall on said retainer member to resist rotation of said retainer member when said retainer member is molded in plastic on a panel.

12. A connector as set forth in claim 9, wherein said slot is keyhole-shaped for receiving said key-shaped stud portion on said hook member.

13. A connector for joining two pieces together comprising:

a hook member for attachment to a first piece member having an outwardly turned hook and a retainer member for said hook supporting said hook member, said hook member comprising:

a guide portion for leading said hook into an aperture in a first piece, said guide portion having a distal portion of reduced thickness;

a fastening portion of said hook member of greater thickness than said distal portion extends away from said guide portion;

a base flange portion attached to said fastening portion of said hook member;

a headed stud extending from the side of said base flange portion opposite said hook member, said headed stud having a shank portion spacing a head portion from said base flange portion, said retainer member for anchoring in a second piece and comprising:

a closed circumferential sidewall supporting a first surface;

a gripping surface spaced from and substantially parallel to said first surface, said gripping surface having a shaped slot therein for receiving said headed stud on said hook member for supporting said hook member; and a cap member for closing the side of said support member opposite said gripping surface.

14. A connector as set forth in claim 13 further including:

an alignment member on the surface of said headed stud, said alignment member having spaced parallel sides; and a pair of projecting members on said cap member, said projecting members extending into said retainer member when said cap is in position to grip said alignment member on said headed stud.

* * * * *

UNITED STATES PATENT AND TRADEMARK OFFICE
CERTIFICATE OF CORRECTION

PATENT NO. : 5,233,731
DATED : August 10, 1993
INVENTOR(S) : David J. Phillips It is certified that error appears in the above-identified patent and that said Letters Patent is hereby corrected as shown below:

Column 1, line 19:

"Which" should be --which--.

Column 5, line 24, claim 7:

"claim 10" should be --claim 6--.

Column 5, line 36, claim 9:

After "and" delete --pl--.

Column 5, line 41, claim 9:

"by ad" should be --by and--.

Column 5, line 43, claim 9:

"sot" should be --slot--.

UNITED STATES PATENT AND TRADEMARK OFFICE
CERTIFICATE OF CORRECTION

PATENT NO. : 5,233,731
DATED : August 10, 1993
INVENTOR(S) : David J. Phillips

It is certified that error appears in the above-indentified patent and that said Letters Patent is hereby corrected as shown below:

Column 6, line 5, claim 11, "lest" should be --least--

Signed and Sealed this

Twenty-fourth Day of May, 1994

Attest:

BRUCE LEHMAN

Attesting Officer          Commissioner of Patents and Trademarks